Patented Apr. 27, 1926.

1,582,456

UNITED STATES PATENT OFFICE.

EDWIN STANTON FAUST, OF BASEL, SWITZERLAND, ASSIGNOR TO SOCIETY OF CHEMICAL INDUSTRY IN BASLE, OF BASEL, SWITZERLAND.

INJECTABLE SOLUTIONS OF DRUGS INSOLUBLE IN WATER.

No Drawing. Application filed June 15, 1923. Serial No. 645,687.

*To all whom it may concern:*

Be it known that I, EDWIN STANTON FAUST, born a citizen of the United States of America, and residing at Basel, Switzerland, have invented new and useful Injectable Solutions of Drugs Insoluble in Water, of which the following is a full, clear, and exact specification.

I have found that the addition of acetonchloroform (tertiary trichlorbutylalcohol), also known as aneson or anesin, to urethane, i. e. the ethylester of carbamic acid, both in the solid or crystalline dry state, results in the liquefaction of the mixture; this liquefaction progressing all the more rapidly and perfectly the more intimately the above substances are brought into contact with one another; i. e. the more perfectly these substances are mixed.

This colorless, water-clear liquid mixture of acetonchloroform and urethane possesses and shows a number of physical-chemical and concomitant pharmacological properties, which lead to and permit of its extensive use and practical application in therapeutics, as will be further explained below.

These findings are, on the one hand, new as a special and concrete example of eutectic reaction, and, on the other hand, exceptional and in general surprising, inasmuch as it was not to be foreseen or assumed that two substances, whose melting points lie above 80° and 50° C., respectively, would, on being brought together and mixed, show such an extreme lowering of their melting points as to become and remain liquid thereafter at ordinary room-temperature.

Further study of the physical and chemical properties of the liquid mixture above described and pharmacological invetigations in this field led to the following observations and discoveries.

(1) The said liquid mixture can be injected subcutaneously, intramuscularly and intravenously into animals and human beings as such and thereupon produces in such injected subjects certain definite pharmacological results and effects, and, furthermore.

(2) The said liquid mixture proves a good solvent for numerous useful and especially therapeutically important chemical compounds, which, owing to their insolubility in indifferent media, particularly in water, could hitherto not be injected; but these can now by very simple physical or physical-chemical means be converted into a soluble and injectable form and state. Hitherto this could be achieved in exceptional cases only by transforming such water-insoluble therapeutic agents by chemical means into frequently pharmacologically less active and badly keeping, i. e. easily decomposable derivatives of same, more or less difficultly soluble, non-neutral salts, etc.

The employment of the above acetonchloroform-urethane mixture as a solvent for drugs to be injected has very evident and undeniable advantages, in certain instances even over the injection of drugs in aqueous solution; this, owing to the fact that the components of the mixture have themselves, separately and collectively, certain pharmacological properties which cause the desired action to set in and develop earlier and more promptly and intensify that action.

Acetonchloroform as well as urethane behaves pharmacologically as an hypnotic and in larger or higher doses as a narcotic of the aliphatic series. The liquid mixture of both acts precisely in the same manner. Hence this mixture is remarkably and particularly well adapted to act supplementarily, i. e. to support, enhance or even to multiply or potentiate the intensity of the action of hypnotics and narcotics dissolved in this mixture, with a qualitatively similar action of its own.

The acetonchloroform-urethane mixture is therefore, i. e. owing to its local anesthetic and hypnotic actions, particularly adapted and fitted, both physically-chemically and pharmacologically speaking, as solvent for substances of sedative and hypnotic action. As examples of such chemical individuals exhibiting these pharmacological actions may be mentioned: the substituted barbituric acids, for instance, diallylbarbituric acid, phenylethylbarbituric acid, diethylbarbituric acid; certain opium-alkaloids, such as narcotin, papaverin; pyrazolon-derivatives, such as 1-phenyl-2.3-dimethyl-5-pyrazolon, 1-phenyl-2.3-dimethyl-4-dimethyl-amino-5-pyrazolon; the well-known phenetidin-derivatives, for instance phenacetin, lactylphenetidin; quinine and its derivatives.

In the above sense and for the above purpose a mixture of acetonchloroform and urethane in the ratio of 1:1, i. e. one part of acetonchloroform to one part of urethane (by weight) has given the best practical results. Nevertheless other proportions of the two solvent constituents may be used.

The acetonchloroform-urethane mixture above described can and will hold in solution 10 to 20% and in certain cases even more of the chemical individuals above separately enumerated, as shown in the following table.

|  | Per cent. |
|---|---|
| Diallylbarbituric acid | 15 |
| Dipropylbarbituric acid | 20 |
| Diethylbarbituric acid | 30 |
| Phenacetin | 15 |
| Narcotin | 10 |
| Papaverin | 20 |
| 1-Phenyl-2. 3-dimethyl-4-dimethylamino-5-pyrazolon | 40 |

What I claim is:—

1. As an article of manufacture for use in therapeutics, a mixture of acetonchloroform-urethane being and remaining liquid at ordinary room-temperature.

2. As an article of manufacture for use in therapeutics, a mixture of equal parts by weight of acetonchloroform and urethane, being and remaining liquid at ordinary room-temperature.

3. As articles of manufacture for use in therapeutics the injectable solutions obtained by dissolving in a liquid mixture of acetonechloroform urethane such water-insoluble drugs which act as torpents on the central nervous system.

4. As articles of manufacture for use in therapeutics the injectable solutions obtained by dissolving in a liquid mixture of acetonechloroform urethane such water-insoluble cyclic compounds containing nitrogen which act as torpents on the central nervous system.

5. As articles of manufacture for use in therapeutics, the injectable solutions of water-insoluble derivatives of barbituric acid in a mixture of acetonchloroform-urethane, the latter being and remaining liquid at ordinary room-temperature.

6. As articles of manufacture for use in therapeutics, the injectable solutions of diallylbarbituric acid in a mixture of equal parts by weight of acetonchloroform-urethane, the latter being and remaining liquid at ordinary room-temperature.

In witness whereof I have hereunto signed my name this 2nd day of June 1923.

EDWIN STANTON FAUST.